United States Patent [19]
Bauer et al.

[11] 3,710,688
[45] Jan. 16, 1973

[54] CONTROL VALVE, ESPECIALLY FOR LEVEL CONTROL VALVE FOR HYDROPNEUMATIC VEHICLE SPRING SYSTEMS

[75] Inventors: Klaus Bauer, Stuttgart-Heumaden; Fritz Naumann, Unterensingen; Hermann Schobbe, Oeffingen, all of Germany

[73] Assignee: Daimber-Benz Aktiengesellschaft, Stuttgart-Unterturkheim, Germany

[22] Filed: March 27, 1970

[21] Appl. No.: 23,428

[30] Foreign Application Priority Data

March 29, 1969 Germany.....................P 19 16 238.8

[52] U.S. Cl......................91/375 R, 91/390, 91/461
[51] Int. Cl..........................F15b 9/10, F15b 13/16
[58] Field of Search....................91/390, 375 R, 461

[56] References Cited

UNITED STATES PATENTS

| | | | |
|---|---|---|---|
| 2,978,256 | 4/1961 | Bertsch et al. | 91/390 |
| 3,028,175 | 4/1962 | Eckman | 91/390 |

FOREIGN PATENTS OR APPLICATIONS

| | | | |
|---|---|---|---|
| 1,256,089 | 12/1967 | Germany | 91/390 |
| 758,761 | 10/1956 | Great Britain | 91/390 |

Primary Examiner—Paul E. Maslousky
Attorney—Craig and Antonelli

[57] ABSTRACT

A control valve for use in particular with a level control system for hydropneumatic vehicle springs in which the housing is provided with a housing connection for the working pressure medium line leading to the cylinder, with a housing connection for a return line, with a housing connection for a line to be connected with a pressure source and with a further housing connection for an auxiliary force; the valve includes within the valve housing, closure valves as well as a valve-adjusting member whereby the valve-adjusting member and valve housing are so connected with the working cylinder and working piston that the working piston is normally adjusted into a first intended position when the pressure medium source supplies a pressure to the corresponding housing connection; the supply of an auxiliary pressure force to the corresponding housing connection causes the parts to be adjusted to a new position in which a second new desired position of the working piston relative to the working cylinder is established; additionally, by appropriate switching of the pressure medium and auxiliary pressure force, the working piston can be displaced into an end position while a communication of the housing connections for the pressure medium and the auxiliary pressure medium with the return line causes the working spaces in the working cylinder to be closed.

46 Claims, 11 Drawing Figures

INVENTORS
KLAUS BAUER
FRITZ NAUMANN
HERMANN SCHOBBE

BY Craig, Antonelli, Stewart & Hill

ATTORNEYS

CONTROL VALVE, ESPECIALLY FOR LEVEL CONTROL VALVE FOR HYDROPNEUMATIC VEHICLE SPRING SYSTEMS

The present invention relates to a control valve, especially to a level control valve for a hydropneumatic vehicle spring system, in which a working pressure medium line for one or several working pressure medium motors is closed off in a center position of the valve-adjusting member and in which the working pressure medium line, with deflections of the valve-adjusting member in the one direction, is in communication with a pressure source whereas with deflections in the opposite direction it is in communication with a pressure-relieved return line of the pressure medium, and in which the coupling or connecting system including the two members consisting of valve housing and closure valve mechanism is arranged immovably with respect to one of the two parts consisting of working cylinder and working piston to be adjusted into a mutual intended or desired position whereas the coupling or connecting system including the two members consisting of valve-adjusting member and control linkage is immovably arranged with respect to the other part. The aim underlying the present invention essentially consists in so constructing and further developing a control valve of this type that the working piston is adapted to be adjusted into more than one intended or desired position with respect to the working cylinder. As solution to the underlying problems, provisions are made according to the present invention that one of the two coupling or connecting members consisting of valve-adjusting member and closure valve mechanism is adjustably connected with respect to the operatively or functionally adjacent member of its coupling or operatively connected system and is displaceable by means of a pressure medium auxiliary motor arranged on the inside of the valve housing from its normal center position with respect to the other coupling end member into at least one additional center position so that upon the adjustment of this coupling end member from its pre-existing into a new center position, one closure valve is initially opened and thereafter the coupling or operatively connected system having the other non-adjustable coupling end member is brought back again into its relative center position with respect to the other coupling or operatively connected system by the change in position of a working piston and as a result thereof, the initially opened closure valve is closed again—whereas, during the return movement of the adjustable coupling end member into the pre-existing center position, the other closure valve is temporarily opened in a corresponding manner.

The proposed solution of the present invention is based on the concept to adjust the closure valve arrangement with respect to the valve-adjusting member or vice versa by a pressure-medium auxiliary-force rendered effective on the inside of the valve housing at a piston surface so that the effective length of the control linkage in relation to the center position of the valve-adjusting member and therewith necessarily the desired or intended position of the working piston to be adjusted is changed. An advantage of the control valve in accordance with the present invention resides in that elastic pressure medium lines may be used for the auxiliary force for the purpose of the adjustment of the one coupling end member with respect to the other. These elastic lines are space-saving as well as can be laid out at will in any desired manner and may be of any desired length.

It may be desirable in case of difficult road or terrain conditions that the spring-supported vehicle body is lifted with respect to the unsprung wheel axles up to an upper abutment end position. For this purpose, the function of the control valve according to the present invention may be further expanded in that the valve housing includes a by-pass channel, by way of which an immediate or direct connection is established between the housing connection for the working pressure medium line and the housing connection for the pressure-medium auxiliary force line, and in that a closure valve is arranged in the by-pass channel which is forcibly controlled in the closing direction by the operating pressure of the housing channel having a free or open communication with the housing connection for the pressure source.

In order to avoid that an emptying of the working cylinder may take place by way of the by-pass channel in case of insufficient operating pressure of the pressure source with a turned-off or disconnected pressure medium auxiliary force, provision is made according to a further feature and development of the control valve of the present invention that a check valve is arranged in the by-pass channel opening in the direction toward the housing connection for the working pressure medium line.

With a turned-off or disconnected pressure source and/or with an insufficient operating pressure thereof, there exists under certain circumstances the danger that the working cylinder is emptied by way of one of the closure valves adapted to be opened by the valve-adjusting member. This disadvantage is eliminated according to a further feature of the present invention in that a closure valve positively or forcibly controlled in the opening direction is arranged in the housing channel having a free communication with the housing connection for the working pressure medium line which control valve is positively or forcibly controlled in the opening direction by the operating pressure of the housing channel having a free communication with the housing connection for the pressure source. It is thereby appropriate that this closure valve is constructed as a check-valve opening in the direction toward the working pressure medium line. It is avoided thereby with certainty that the pressure in the working cylinder drops below a predetermined minimum value.

The control valve according to the present invention exhibits four operating ranges which will be explained more fully hereinafter. The control valve is brought into the respective operating position of an operating range by valve means arranged in the line between the pressure source and the associated housing connection of the control valve as also in the line between the pressure source for the auxiliary force and the associated housing connection for the control valve. These valve means control the pressure medium force in both lines in such a manner that either one or both lines for the pressure medium force are opened or closed.

It is achieved by the present invention that with an arrangement of one control valve each at the two vehicle axles, only three pressure medium lines are necessary between these two valves.

The adjustment provided by the present invention of the closure valve mechanism with respect to the valve-adjusting member can be achieved, for example, in that an adjusting slide valve member arranged in a housing bore in a pressure-tight and displaceable manner has a pressure medium space as well as an inlet and an outlet channel, and in that the pressure medium space is in continuous free communication with a first housing channel that can be brought into communication with the housing connection for the working pressure medium line, and in that the pressure medium space is connected by way of one closure valve each adapted to be opened by the valve-adjusting member with the inlet channel as well as with the outlet channel, and in that both the inlet channel as also the outlet channel are in continuous free communication with a respective one of two further housing channels.

According to a further feature of the present invention, two types of valve constructions are proposed for the adjustment of the valve-adjusting member with respect to the stationary or fixedly arranged closure valve mechanism. In the first type of construction, use is made to arrange the valve-adjusting member adjustable as a unit and to equip the same for each center position with special, separate means for the actuation of the closure valves. According to the present invention, this is achieved in particular in that a valve-adjusting shaft axially adjustably mounted with respect to the closure valves arranged fixedly in the valve housing is non-rotatably connected with the control linkage in relation to its axis so as to rotate in unison therewith and is displaceably connected therewith along this axis, and in that the valve-adjusting shaft includes for each of its center positions disposed one behind the other in the circumferential direction, a separate axially extending control-edge pair for the adjustment of the working piston into one desired or intended position as well as two control edges each extending in the circumferential direction for the adjustment of the working piston between two desired or intended positions, and in that the valve-adjusting shaft is rotatably and axially non-displaceably connected with an auxiliary adjusting piston coaxially guided in the valve housing in a pressure-tight and displaceable manner.

In the second embodiment of the control valve according to the present invention having an adjustable arrange of the valve-adjusting member with respect to the closure valve mechanism fixed in the valve housing, the change of the effective length of the control linkage is achieved in that the valve-adjusting member is constructed as a multi-sectional or multi-partite adjusting transmission or linkage in which the input adjusting member is connected with the control linkage and is adjustable by the pressure medium auxiliary force into several working positions with respect to the output adjusting member equipped with the means for the actuation of the closure valves fixedly arranged in the valve housing so that the input adjusting member assumes for each desired or intended position of the working piston a separate center position with respect to the closure valves whereas, the center position of the output adjusting member is the same for all intended or desired positions of the working piston.

Accordingly, it is an object of the present invention to provide a control valve, especially a level control valve for hydropneumatic vehicle spring systems which avoids by simple means the aforementioned shortcomings and drawbacks encountered in the prior art.

Another object of the present invention resides in a control valve of the type described above which increases the versatility of the operation of the system controlled thereby, yet is relatively simple in construction and reliable in operation.

A further object of the present invention resides in a level control valve for hydropneumatic vehicle spring system which minimizes the number of lines necessary, permits a layout of such lines at will and allows for several intended or desired positions of the working piston with respect to the working cylinder of a given hydropneumatic spring.

Still another object of the present invention resides in a control valve assembly of the type described above which excels by a particularly advantageous and compact type of construction.

These and further objects, features and advantages of the present invention will become more obvious from the following description when taken in connection with the accompanying drawing, which shows, for purposes of illustration only, several embodiments in accordance with the present invention, and wherein.

Figure 1:
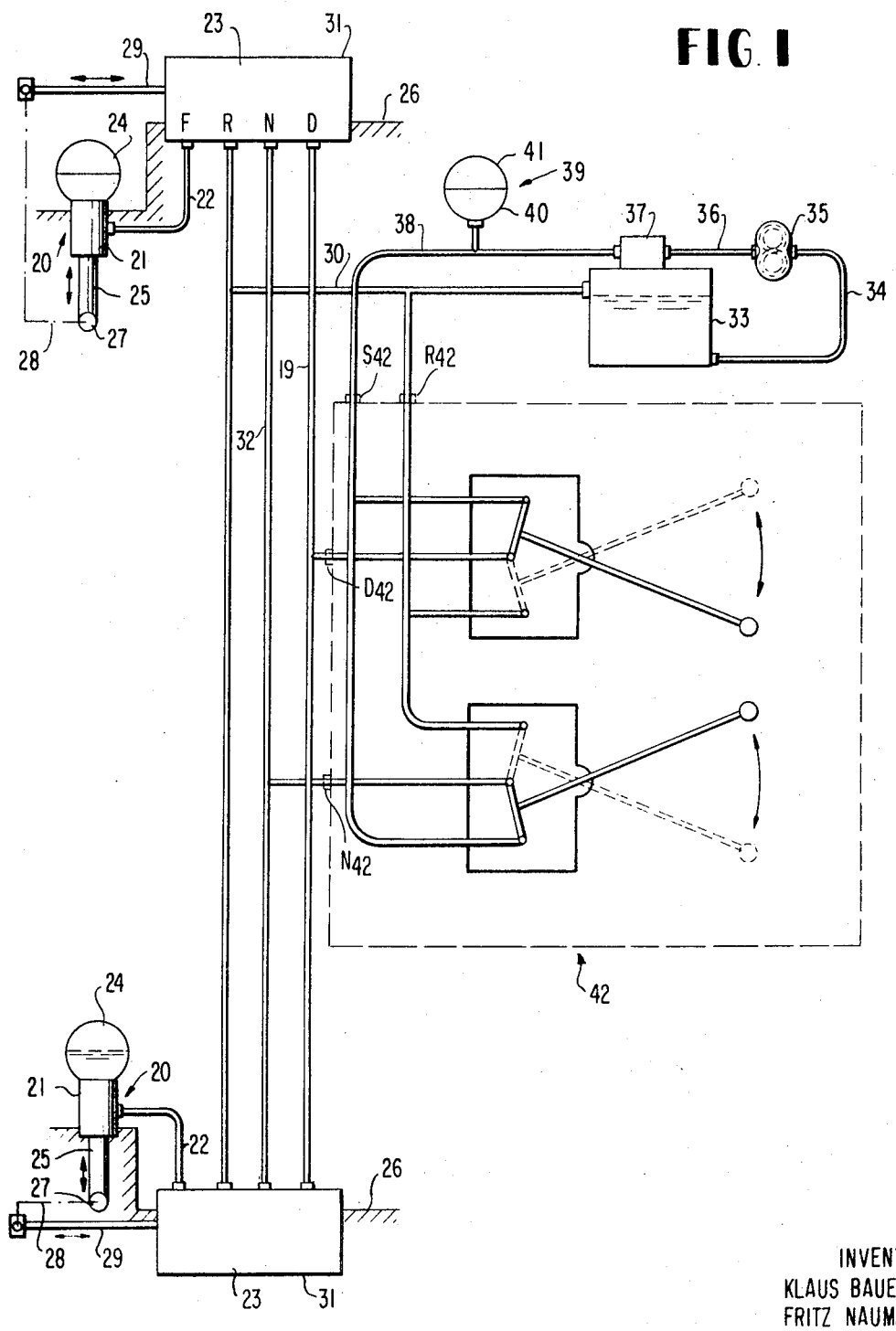
FIG. 1 is a schematic diagrammatic view of a level control system for a hydropneumatic vehicle spring system utilizing a control valve in accordance with the present invention.

Referring now to the drawing wherein like reference numerals are used throughout the various views to designate like parts, and more particularly to the schematic arrangement illustrated in FIG. 1, two hydropneumatic spring legs generally designated by reference numeral 20 and of any conventional construction are indicated in this figure for the front and rear axles of a motor vehicle, whose hydraulic working cylinders 21 are each in free communication with a hydraulic working pressure medium line 22 which, in turn, is connected to a respective level control valve 23 to be described more fully hereinafter. The housing connection of the level control valve 23 for the working pressure medium line 22 is designated by reference character F. The working spaces of the working cylinders 21 are constantly under the pressure effect of a respective gas spring 24. The working pistons 25 displaceable in the working cylinders 21 are indicated as plunger pistons. The working cylinders 21 are connected with the vehicle body or superstructure 26 schematically indicated and the working pistons 25 are connected with a respective wheel guide member or part 27. The relative movements of the working pistons 25 with respect to the associated working cylinders 21 are transmitted to the valve-adjusting member 29 by way of a control linkage 28 of conventional construction and indicated in dash and dot lines. In the constructional position of the vehicle body 26 indicated in FIG. 1, the working piston 25 is in its normal desired or intended position with respect to the working cylinder 21. The effective length of the control linkage 28 which determines the center position of the valve-adjusting member 29 with respect to the two closure valves for the working pressure medium line 22 in the control valve 23, to be described more fully hereinafter, is so matched that the valve-adjusting member 29 is forcibly or positively brought into its center position with respect to the closure valves, if the working piston 25 is in its intended or desired position. In the center position of the valve-adjusting member 29, the working pressure medium line 22 is closed.

The control valve 23 is further provided with a housing connection R for a pressure-relieved return line 30 as well as with a housing connection D for a pressure medium line 19. Depending on whether the working piston 25 is spring-deflected inwardly or outwardly with respect to its intended or desired position owing to a changed vehicle load, a closure valve interconnected between the housing connections D and F or a closure valve interconnected between the housing connections R and F is opened for such length of time as a result of the deflection of the valve-adjusting member 29, forcibly obtained thereby, from its center position into the one or other direction, until the working piston 25 is brought back into its intended or desired position.

An arrangement of the type described so far is already known in the prior art.

According to the proposal of the present invention, the parts consisting of the working piston 25, of the control linkage 28 and of the valve-adjusting member 29 are considered as members of a first coupling or connecting system whose end member is constituted by the valve-adjusting member 29 and which is adjustable relative to a second coupling or connecting system whose members are formed by the valve housing 31 and the closure valves, whereby the closure valves are considered as unitary end members of this second coupling or connecting system. In order to change the intended or desired position of the working piston 25 with respect to the working cylinder 21 by a change of the effective length of the control linkage 28, it is proposed according to the present invention to arrange either the end member (valve-adjusting member 29) of the first coupling or connecting system adjustable in the valve housing 31 with respect to the end member (closure valves) of the second coupling system or vice versa. Furthermore, the adjustment of the end member is to take place by a pressure medium auxiliary force rendered effective on the inside of the valve housing 31. The housing connection at the control valve 23 for the pressure medium auxiliary force is designated by N.

The return line 30 terminates in a pressure medium tank 33 to which is connected the suction line 34 of a high-pressure pump 35. The pressure line 36 of this high pressure pump 35 is connected by way of a pressure control valve 37 of conventional construction to a pressure reservoir line 38. It is assured by means of the pressure control valve 37 that the operating pressure in a conventional pressure reservoir generally designated by reference numeral 39 and connected with the line 38, whose pressure medium chamber 40 is constantly under the effect of a gas spring 41, cannot drop below a minimum value. With pressures above this minimum value, the pressure reservoir line 38 is disconnected from the high pressure pump 35 by means of this valve 37 and the pressure line 36 thereof is connected with the pressure medium tank 33.

The pressure reservoir line 38 can be brought into communication by means of a conventional control valve mechanism generally designated by reference numeral 42 with the line section 19 for the valve housing connection D as well as with the line 32 for the valve housing connection N. For this purpose, the control valve mechanism 42 is provided with valve connections $N_{42}$ for the line 32, $D_{42}$ for the line 19, $S_{42}$ for the pressure reservoir line 38 and $R_{42}$ for the return line 30.

Initially two shifting operations are possible by means of the mechanism 42 in which one of the valve connections $N_{42}$ and $D_{42}$ is connected with the valve connection $S_{42}$ and the other with the valve connection $R_{42}$. By means of two further shifting operations of this mechanism, the two valve connections $N_{42}$ and $D_{42}$ can be brought together into communication either with the valve connection $S_{42}$ or with the valve connection $R_{42}$.

Since the control mechanism 42 is of conventional, known construction, it is merely shown schematically and a detailed description thereof is dispensed with herein.

Figure 2:
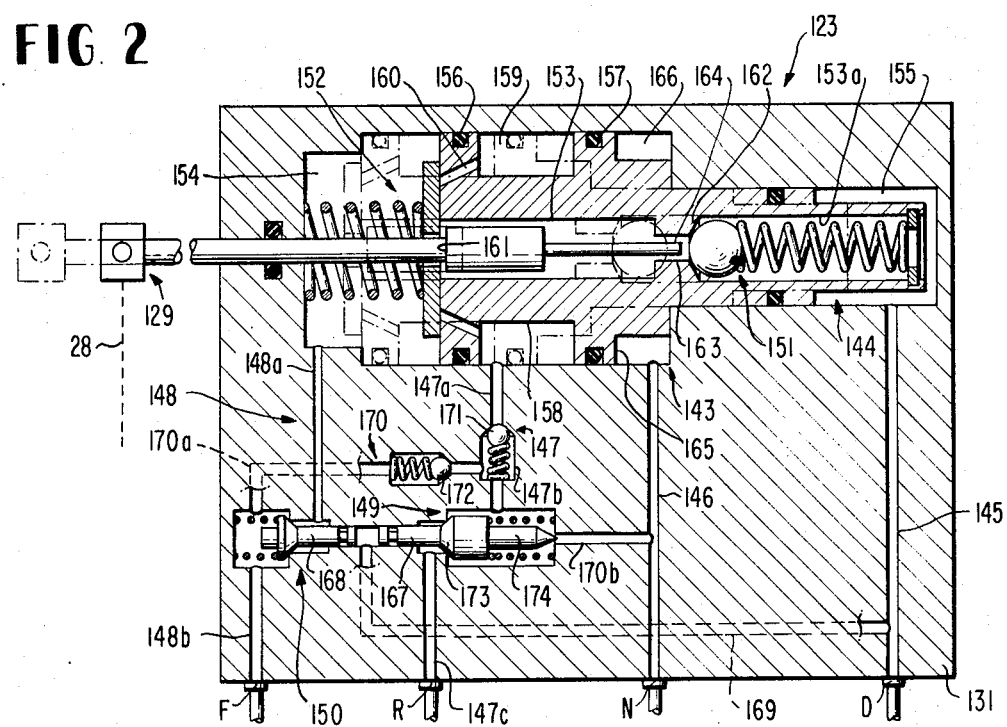
FIG. 2 is a somewhat schematic cross-sectional view through a first embodiment of a control valve in accordance with the present invention.
Figure 3:
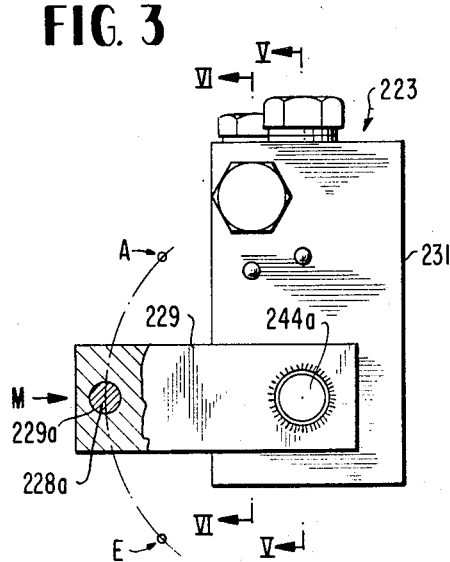
FIG. 3 is a front elevational view of a second embodiment of a control valve in accordance with the present invention.
Figure 4:
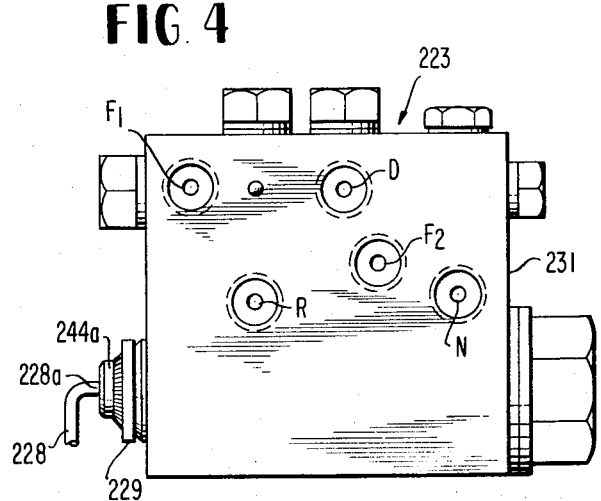
FIG. 4 is a side elevational view of the second embodiment of the control valve in accordance with the present invention as shown in FIG. 3.

Referring now to FIG. 2, wherein like reference numerals of the 100-series are used, the control valve generally designated by reference numeral 123 and indicated somewhat schematically in this Figure, includes a valve housing 131 which is provided with a housing bore generally designated by reference numeral 143 for an adjusting slide valve member generally designated by reference numeral 144; four parallel housing channels generally designated by reference numerals 145, 146, 147 and 148 terminate in the housing bore 143. The housing channels 145 and 146 are in free, unobstructed communication with a respective housing connection D and N, respectively. The two other housing channels 147 and 148 are each subdivided by a respective spring-loaded closure valve generally designated by reference numeral 149 and 150, adapted to be controlled in the opening direction, into two channel sections 147a, b, and 147c, and into two channel sections 148a and 148b, respectively, of which the channel section 147c and 148b, adapted to be closed off with respect to the housing bore 143, is in free communication with the housing connection R and F, respectively. The adjusting slide valve member 144 is equipped with two spring-loaded closure valves generally designated by reference numerals 151 and 152 which are adapted to be opened by means of the valve-adjusting rod 129. The closure valve 151 constructed as ball check-valve closes an axial bore 153 provided in the slide valve member 144 with respect to a coaxial bore section 153a of the adjusting slide valve member 144. A communication between a first and a second housing space 154 and 155 may be established by the closure valve 151. The first housing space 154 is in free communication with the channel section 148a whereas the second housing space 155, separated in a pressure-tight manner with respect to the first housing space 154, is in free communication with the housing channel 145.

Two seals 156 and 157 arranged at the circumference of the adjusting slide valve member 144 as well as the cross-section of a circumferential groove 158 of the adjusting slid member 144 disposed between the seals 156 and 157 enclose therebetween a third housing space 159 which is in constant, free communication with the channel section 147a. Intermediate channels 160 branch off from the circumferential groove 158 which are closed off with respect to the first housing space 154 by the closure valve 152. The closure valve 152 can be opened by a control edge 161 of the valve adjusting rod 129 whereas the other closure valve 151, whose valve seat 162 is constituted by a constriction 163 of the adjusting slide valve member 144, is pushed open by a fixed coaxial plunger 164 of the valve adjusting rod 129.

The adjusting slide member 144 is provided with a piston surface 165 which is arranged in a further housing space 166 that is in free communication with the housing channel 146.

The closure valves 149 and 150 constructed as spring-loaded check-valves are pushed open by a respective adjusting piston 167 and 168. These adjusting pistons 167 and 168 are under the effect of the pressure in the housing channel 145 by way of a housing branch-channel 169.

The channel section 148b in direct communication with the housing connection F is connected with the housing channel 146 by way of a by-pass housing channel generally designated by reference 170 by-passing the closure valves 151 and 152. The by-pass housing channel 170 and the housing channel 147 have in common the channel section 147b, by means of which the by-pass housing channel 170 is subdivided into two further channel sections 170a and 170b. The common channel section 147b is closed by one ball check-valve 171 and 172 each with respect to the channel sections 147a and 170a, respectively. The check-valve 171 opens into the common channel section 147b whereas the check valve 172 opens into the channel section 170a. The common channel section 147b is further separated with respect to the channel section 147c by the closure cone 173 of the closure valve 149 constructed as 2/2-traveling valve, whose second closure body 174 fixedly connected with the closure cone 173 is able to close off the two channel sections 147b and 170b with respect to each other.

The channel section 147a may also be connected directly with the channel section 147c. In this type of construction the valves 171 and 173 may be dispensed with.

OPERATION

The operation of the control valve 131 of FIG. 2 is as follows.

The housing connections F, R, N and D of this valve are connected and operated exactly as the corresponding connections of the control valve 23 in FIG. 1, utilizing conventional valve means 42 of any known construction, whereby similar parts are designated by corresponding reference numerals of the one hundred series. The valve adjusting rod 129 is operatively connected, corresponding to the arrangement in FIG. 1, with the control linkage 28 only schematically indicated in FIG. 2. Then four operating ranges result from the four described shifting variations of the control valve mechanism 42.

FIRST OPERATING RANGE

The two valve connections $D_{42}$ and $S_{42}$ as well as the two valve connections $N_{42}$ and $R_{42}$ are connected with each other, respectively by the control mechanism 42.

As a result thereof, the pressure medium auxiliary force is turned off since the housing connection N is connected thereby with the pressure-relieved return line 30 and the housing channel 146 is therefore pressure-relieved, whereas the housing channels 145 and 169 are under the operating pressure of the pressure reservoir 39 since the housing connection D is connected with the pressure line 38. Consequently, the closure valves 150 and 173 are forcibly opened and the by-pass housing channel 170 is closed by the closure valve 174 closing the by-pass channel section 170b. The adjusting slide valve member 144 is in the illustrated, normal relative center position with respect to the valve adjusting rod 129 as a result of the effect of the pressure and/or a spring in the housing space 154. The working pistons 25 are adjusted by way of the valves 151 and 152 into the normal intended position with respect to the working cylinders 21.

SECOND OPERATING RANGE

The control mechanism 42 is actuated so that both valve connections $D_{42}$ and $N_{42}$ are in communication with the valve connection $S_{42}$.

The position of the closure valves 168, 173 and 174 is unchanged with respect to the first operating range. The adjusting slide valve member 144 is brought into the relative center position indicated in dash and dot line with respect to the valve adjusting rod 129 as a result of the effect of the pressure medium auxiliary force on the piston surface 165. Consequently, at first, the closure valve 151 is opened so that as a result of the communication between housing connections D and F by way of channel 145, space 155, bore 153a, bore 153 in continuous open communication with space 154, and channel sections 148a and 148b, the working piston 25 is spring deflected out of the working cylinder 21 to such an extent until the adjusting rod 129 is brought into its new center position with respect to the adjusted closure valves 151 and 152 as a result of its coupling with the spring-deflected working piston 25, by way of the control linkage 28 causing the rod 129 to move toward the left, as viewed in FIG. 2; in this new center position of rod 129, the initially opened closure valve 151 is automatically closed again. As a result thereof, the outward spring deflection of the working piston 25 is forcibly terminated, and the piston 25 finds itself in its new intended or desired position with respect to the working cylinder 21. Since the distance between the working piston 25 and the working cylinder 21 in the new intended or desired position is larger than in the normal intended position, also the control linkage 28 interconnected between these two parts has to undergo an extension of its effective length. This lengthening was achieved by the change in position of the closure valves 151 and 152 with respect to the valve housing 131 by means of the adjusting slide valve member 144.

During the return movement of the adjusting slide valve member 144 into the illustrated relative center position by a connection in the control mechanism 42 of the valve connection $N_{42}$ with valve connection $R_{42}$, the other closure valve 152 is temporarily opened in a corresponding manner by engagement of the control edge 161 with closure valve 152 so that the working piston 25 spring-deflects into the working cylinder 21 owing to the communication between housing connection F and housing connection R by way of bores 160, channel section 147a, open valve 171 and housing channel 146 until the valve adjusting rod 129 is again in its pre-existing or original center position with respect to the valve housing 131 and the closure valve 152 is closed.

THIRD OPERATING RANGE

The two valve connections $N_{42}$ and $S_{42}$ as well as the two valve connections $D_{42}$ and $R_{42}$ are connected with each other, respectively, by the valve control mechanism 42.

This means that the channel section 148b in free communication with the working cylinder 21 is closed with respect to the valves 151 and 152 by means of the closure valve 150, now closed in the absence of a pressure in lines 145 and 169 by the spring force, and is connected with the housing channel 146 for the pressure medium auxiliary force by way of the closure valve 174, now opened by the spring force in the by-pass channel 170, the check-valve 172 opening in the presence of a higher pressure in line 146, 170b than in line 170a, 148b. As a result thereof the working pistons 25 are forced to spring-deflect outwardly up to the constructively possible end position. This is desirable when driving over difficult terrains or steep ramps.

FOURTH OPERATING RANGE

The two valve connections $D_{42}$ and $N_{42}$ are now in communication with the valve connection $R_{42}$ as a result of the operation of control mechanism 42.

The positions of the closure valves 150, 173 and 174 remain unchanged with respect to the third operating range since the lines 145 and 169 remain without pressure, i.e., the closure valves 151 and 152 actuated by the valve adjusting rod 129 are effectively turned-off or disengaged and the by-pass channel 170 is closed off with respect to the now pressure-relieved housing channel 146 by the check-valve 172. The pressure medium filling contained in the working cylinders 21 remains constant. This is desirable, for example, for a wheel change or for a ship-loading of the vehicle.

The second embodiment of the control valve generally designated by reference numeral 223 and illustrated in FIGS. 3–7, in which similar parts are designated by corresponding reference numerals of the 200 series, includes for the purpose of changing the effective length of the control linkage indicated by reference numeral 228, a valve adjusting shaft 244 rotatably and axially adjustably supported in a housing bore 243 of the valve housing 231. An end pin 244a at the end face of the valve adjusting shaft 244 is non-rotatably connected with an adjusting lever 229 to rotate in unison therewith; the adjusting lever 229 is provided at its free end with a bore 229a (FIGS. 3 and 7) into which a fixed pin 228a (FIGS. 3 and 4) of the control linkage 228 engages displaceably. Depending on the pivoting direction of the adjusting lever 229 from its center position M (FIG. 3) into the one or other direction (positions A or E), one of the two closure valves generally designated by reference numerals 251 and 252 (FIG. 5) arranged together with the valve adjusting shaft 244 in the same housing plane V—V, is opened. For this purpose, the valve adjusting shaft 244 is provided at its circumference with a first axially extending control edge pair 275 and 276 which cooperates with the balls 277 and 278, displaceably guided in the valve housing 231 form-lockingly and perpendicularly to the valve shaft 244, for pushing open the closure valve 252 and 251 constructed as check-valves.

The valve adjusting shaft 244 is operatively connected or coupled with the auxiliary adjusting piston 265 (FIG. 5) constructed as plunger of a pressure-medium adjusting motor generally designated by reference numeral 280 and arranged in the housing bore 243; the cylinder part 281 of the adjusting motor 280 which is cup-shaped in longitudinal cross-section, is threaded into a threaded end section 243a of the housing bore 243 and is sealed by an annular seal 282 with respect to the valve housing 231. The working space 266 of the adjusting piston 265 is closed off at its end opposite the cylinder part 281 by a closure part 284 inserted in a pressure-tight and non-displaceable manner into the housing bore 243. The closure part 284 is provided with a concentric bore 285, through which extends the adjusting piston 265 in a pressure-tight and displaceable manner. The outer end 218 of the adjusting piston 265, i.e., outer in relation to the working space 266, abuts at the end face 286 of a cylindrical, axial recess 287 of the valve adjusting shaft 244 whereas the inner end of the adjusting piston 265 is supported at the cylinder part 281. An elastic abutment sleeve 217 as well as a rigid abutment ring disc 289 are placed and mounted over the outer piston end 218. The abutment ring disc 289 is inserted into the recess 287 and is supported in one direction against a retaining ring 290 inserted into an annular groove of the recess 287 and in the other direction against a retaining ring 291 inserted into an annular groove of the piston end 218. Similarly, an elastic abutment sleeve 292 as well as a rigid abutment ring disc 293 are placed and mounted over the inner end 288 of the adjusting piston 265. The abutment ring disc 293 abuts on one side at a compression spring 294 supported at the part 284 and at the other side, against a retaining ring 295 inserted into an annular groove of the piston end 238.

The valve-adjusting shaft 244 is retained in the illustrated normal center position by the compression spring 294 or is brought into the same. As a result of the pressure medium auxiliary force acting on the cross-section of the adjusting piston 265, the valve-adjusting shaft 244 can be displaced into a second center position offset in the circumferential direction whereby a control edge 297 (FIG. 7) extending in the circumferential direction of the valve-adjusting shaft 244 temporarily pushes open the closure valve 251 so that the working piston 25 spring deflects outwardly and rotates the valve adjusting shaft 244 by way of control linkage 228. As a result of the pressure relief of the working space 266, the valve adjusting shaft 244 is brought back again into its normal center position whereby a second control edge 296 (FIG. 7) extending in the circumferential direction, temporarily pushes open the other closure valve 252 so that the working piston 25 again spring-deflects inwardly and rotates back the valve-adjusting shaft 244.

Figure 5:
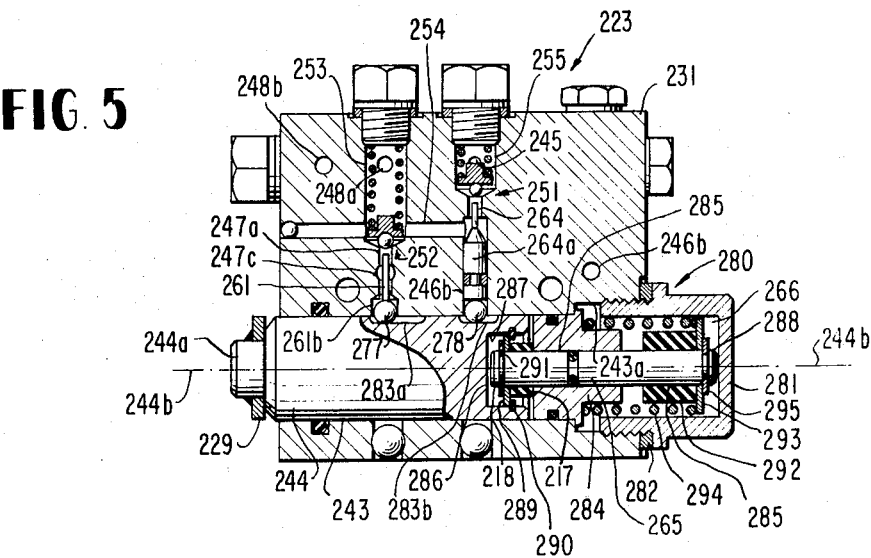
FIG. 5 is a cross-sectional view through the second embodiment of the control valve in accordance with the present invention, taken along line V—V of FIG. 3.
Figure 6:
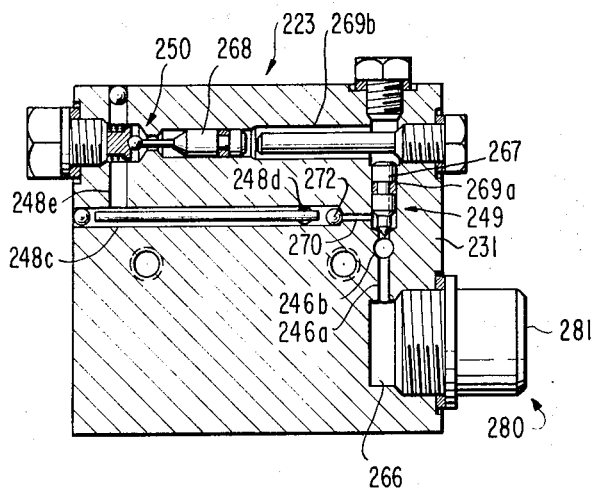
FIG. 6 is a further cross-sectional view, taken along line VI—VI of FIG. 3, through the second embodiment of the control valve in accordance with the present invention.
Figure 7:
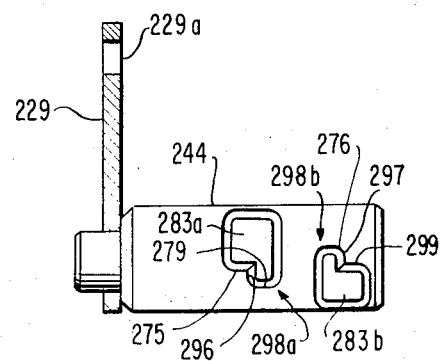
FIG. 7 is a plan view on the axially adjustable valve-adjusting shaft as individual part of the second embodiment of the control valve according to the present invention.

Five housing channels extending H-shaped to one another are arranged in the housing plane V—V of FIG. 5, of which the web channel 254 disposed parallel to the valve-adjusting shaft 244 is connected with two parallel leg channels 255 and 247a arranged on different sides of the web channel 254 and extending perpendicularly to the valve-adjusting shaft 244, by way of one respective closure check valve each, generally designated by reference numerals 251 and 252 adapted to be controlled in the opening direction by the valve-adjusting shaft 244. Each of these two leg channels 255 and 247a is in free communication with a housing channel 245 and 247c, respectively, disposed perpendicularly to the housing plane V—V, which, in its turn, terminates in a housing connection D and R (FIG. 4), respectively, for the line 19 and the return line 30. The two leg channels 247a and 264b disposed together with the valve-adjusting shaft 244 on the same side of the web channel 254, terminate in the housing bore 243 of the valve-adjusting shaft 244. The closure check valve 252 of the leg channel 247a opens into the web channel 254 and is pushed open by a ball 277 cooperating with the associated indentation 283a (FIGS. 5 and 7) of the valve-adjusting shaft 244. The ball 277 is form-lockingly and displaceably guided in the shaft-side end section 261b of the leg channel 247a.

An adjusting piston 264a is guided in a pressure-tight and displaceable manner in the other leg channel 264b terminating in the housing 243; the adjusting piston 264a abuts at its shaft-side end against a second ball 278 form-lockingly and displaceably guided in the leg channel 264b; the second ball 278 cooperates with the other indentation 283b (FIGS. 5 and 7) of the valve-adjusting shaft 244. The adjusting piston 264a is provided at the opposite end with a fixed plunger 264 which opens the closure check valve 251 opening into the coaxial leg channel 255.

The free fourth leg channel 253 is in free communication both with the web channel 254 as also with a third housing cross channel 248a disposed perpendicularly to the housing plane V—V. The third housing cross channel 248a is connected with a longitudinal channel 269b arranged in a housing plane VI—VI (FIG. 6) parallel to the first housing plane V—V. Four housing channels 169b; 248e; 248c, 270 and 246a, 269a arranged in rectangular shape are provided in the second housing plane VI—VI extending through the working space 266 of the auxiliary adjusting piston 265, of which the two lateral channels 248e and 246a, 269a extend perpendicularly to the valve-adjusting shaft 244 and of which the two longitudinal channels 269b and 248c, 270 extend parallel to the valve adjusting shaft 244. The one lateral channel 246a, 269a is provided with a channel section 246a subdivided by a closure valve generally designated by reference numeral 249 which is adapted to be controlled in the closing direction; the channel section 246a is in free communication both with the working space 266 of the adjusting piston 265 as well as with a further housing cross channel 246b perpendicular to the housing plane VI—VI. The housing cross channel 246b terminates in the housing connection N for the pressure medium auxiliary force.

The channel section 269a of the lateral channel 246a, 269a (FIG. 6) adapted to be closed off with respect to the working space 266 is in communication at its ends with a respective one of the two longitudinal channel sections 248c, 270 and 269b. An adjusting piston 267 for the closing of the closure valve 249 is guided in a pressure-tight and displaceable manner in the channel section 269a intermediate the orifices of these longitudinal channels.

An adjusting piston 268 is similarly guided in a pressure-tight and displaceable manner in the longitudinal channel 269b; the adjusting piston 268 valves in the opening direction the closure check valve 250 subdividing this longitudinal channel 269b with respect to the other lateral channel 248e. The housing cross channel 248a which is in free communication with the fourth leg channel 253 of the first housing plane V—V, terminates in the longitudinal channel 269b of the second housing plane VI—VI intermediate the closure valve 250 and the adjusting piston 268. The sections of the longitudinal channel 269b and of the lateral channel 246a, 269a disposed between the adjusting pistons 267 and 268 are in free communication with the housing cross channel 245.

The other longitudinal channel 248c, 270 of the second housing plane VI—VI is subdivided by a check valve 272 into a by-pass channel section 270 and into a further channel section 248c. The by-pass channel section 270 terminates in the channel section 269a of the lateral channel 246a, 269a adapted to be closed off with respect to the working space 266. The other channel section 248c of the longitudinal channel 248c, 270 is in free communication both with the second lateral channel 248e as also with a further housing cross channel 248d (FIG. 6) perpendicular to the housing plane VI—VI. A housing cross channel 248b (FIG. 5) perpendicular to the housing plane VI—VI also terminates in the lateral channel 248e. The housing cross channels 248b and 248d are in free communication with a housing connection $F_1$ and $F_2$ for a working pressure medium line 22, respectively.

The other closure valve 252 of the web channel 254 is opened by a plunger 261 which is supported in the housing channel 247a with play and displaceably as well as abuts at its end opposite the closure valve 252 directly at the ball 277.

The two balls 277 and 278 are arranged, respectively, in the trough-shaped indentations 283a and 283b provided at the circumference of the valve-adjusting shaft 244. The indentations 283a and 283b are mutually offset both in the circumferential direction as also in the longitudinal direction of the valve-adjusting shaft 244. The lateral edges 298a and 298b of these indentations, which face mutually in the circumferential direction, are constructed step-shaped. The control edge 275 and 276 extending in the longitudinal direction for pushing open the associated closure valve 252 and 251 in the illustrated normal center position, passes over into a control edge 296 and 297, respectively, extending in the circumferential direction for the pressure medium, adjusting motor 280, whereas the control 296 and 297 passes over again into a longitudinally extending control edge 279 and 299 for the additional center position of the valve-adjusting shaft 244.

As follows directly from the arrangement of the control edges offset in the circumferential direction, for the two different center positions, the additional center position M' (not shown) of the adjusting lever 229 is changed with respect to the normal center position M by a pivot angle proportional to the control edge offset in the clockwise direction. From this follows the aimed-at change of the effective length of the control linkage 228.

The shifting of the control valve 223 corresponds to the shifting operation for the control valve 23 illustrated in FIG. 1 by means of the control mechanism 42. The following operating ranges result from the four shifting positions of the shifting mechanism 42 which correspond to those of the control valve 123.

FIRST OPERATING RANGE

The two valve connections $D_{42}$ and $S_{42}$ as well as the two valve connections $N_{42}$ and $R_{42}$ are connected with each other, respectively.

The valve-adjusting shaft 244 is in the normal center position since the pressure medium auxiliary force is blocked, i.e., rendered ineffectual, and the working space 266 is pressure-relieved, i.e., has become pressureless by way of channels 246a and 246b. The by-pass channel 270 is closed by the closure valve 249 whereas the web channel 254 is in free communication with the two housing connections $F_1$ and $F_2$ by way of the opened closure valve 250. As a result thereof, the two working pistons of these housing connections $F_1$ and $F_2$ are adjusted into the normal intended or desired position.

SECOND OPERATING RANGE

Both valve connections $D_{42}$ and $N_{42}$ are in communication with the valve connection $S_{42}$.

The positions of the closure valves 249 and 250 remain unchanged with respect to the first operating range. The valve-adjusting shaft 244 is brought into the additional center position by the adjusting motor 280 whereby the closure valve 251 is opened by the control edge 297 for such length of time until the working pistons spring-deflected outwardly as a result of this valve opening, have rotated the valve-adjusting shaft 244 in the counter-clockwise direction (FIG. 3) by way of the control linkage 228 for such a distance until the ball 278 is again received by the indentation or recess 283b. In this new (not shown) center position M' of the adjusting lever 229, the ball 278 abuts at the control edge 299 and the ball 277 at the control edge 279 whereas the working pistons 25 are brought into the new desired or intended position. If the working pistons of the hydropneumatic spring legs change the position thereof with respect to the corresponding working cylinder as a result of pressure changes in the respective gas springs, then the normal regulating operation and function of the control valve commences.

During the return movement of the valve-adjusting shaft 244 into the normal center position by disengagement or disconnection of the pressure medium auxiliary force in the housing channel 246b, the other closure valve 252 is opened by the control edge 296 so that the valve-adjusting shaft 244 is rotated in the clockwise direction as a result of the inward spring deflection of the working pistons 25 to such an extent until the ball 277 again reaches the area of the indentation 283a so that the adjusting lever 229 is in the original center position M.

THIRD OPERATING RANGE

The two valve connections $N_{42}$ and $S_{42}$ as well as the two valve connections $D_{42}$ and $R_{42}$ are connected with each other.

The closure valve 249 is opened by the pressure in the line 246a connected with housing connection N by way of cross channel 246b whereas the closure valve 250 is closed by the spring force. As a result thereof, the closure valve 251 and 252 controlled by the valve-adjusting shaft 244 are disconnected in effect from the working spaces of the hydropneumatic spring legs. These working spaces are in communication by way of the by-pass channel 270 directly with the housing connection N connected with the pressure reservoir line 38 so that the working pistons spring deflect out up to a constructively possible end position.

FOURTH OPERATING RANGE

The two valve connections $D_{42}$ and $N_{42}$ are in communication with the valve connection $R_{42}$.

The positions of the closure valves 249 and 250 remain unchanged with respect to the third operating range whereby, however, the by-pass channel 270 is closed by the check valve 272 with respect to the housing connections $F_1$ and $F_2$. As a result thereof, the pressure medium filling in the working spaces of the hydropneumatic spring legs remains constant.

Figure 8:
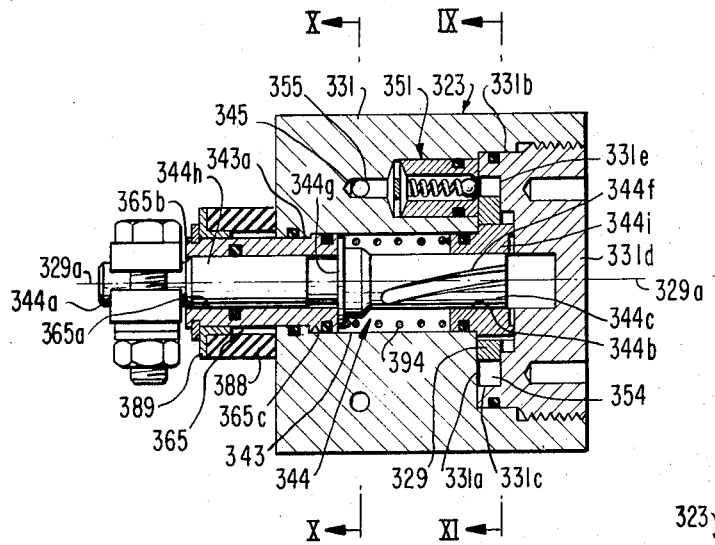
FIG. 8 is a longitudinal cross-sectional view through the housing of a third embodiment of a control valve in accordance with the present invention, taken along line VIII—VIII of FIG. 9.
Figure 11:
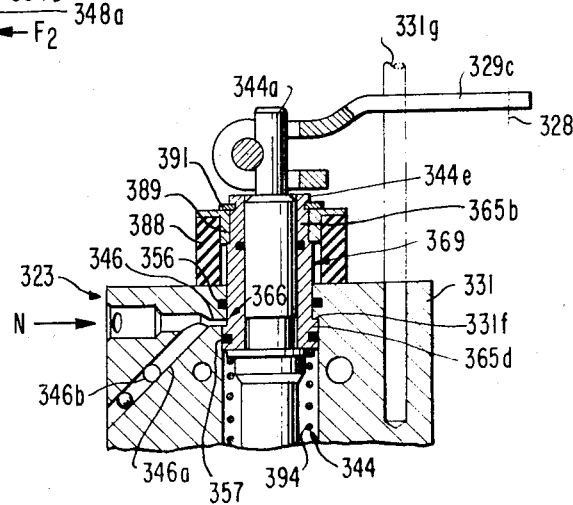
FIG. 11 is a cross-sectional view through the third embodiment of the control valve in accordance with the present invention, taken along line XI—XI of FIG. 10.

The third embodiment of the control valve generally designated by reference numerals 323 and illustrated in FIGS. 8 and 11, in which similar reference numerals of the 300 series are used to designate corresponding parts, is equipped with a rotary slide valve member 329 which is both rotatably supported and axially non-displaceably supported in a housing space 354 of the valve housing 331. The housing space 354 is delimited on one side by the end wall 331a of a cylindrical recess 331b of the valve housing 331 and on the other side as well as at the circumference by a cylindrical recess 331c of a housing cover 331d threaded into the aperture 331b. The rotary slide valve member 329 has over its entire circumference a free play with respect to the recess 331c and abuts slidingly on one side thereof against the end wall 331a of the valve housing 331 and on the other side thereof against the end wall 331e of the recess 331c.

The housing space 354 is connected by way of one closure valve each generally designated by reference numerals 351, 352 and 354a (FIG. 9) with a respective one of three housing longitudinal channels 355 (FIGS. 8 and 10), 360 (FIG. 9) and 354b (FIG. 10) extending parallel to the axis of rotation 329a of the rotary slide valve member 329.

The housing longitudinal channel 355 terminates in a housing cross channel 345 (FIG. 10) which is in free communication with the housing connection D for the pressure reservoir 39 or the line 19.

The housing longitudinal channel 360 terminates in a housing cross channel indicated at 347 (FIG. 9) in dash and dot lines which, at one end, is in free communication with the housing connection for the return line indicated in dash line by R and at the other in a manner not illustrated, in a housing longitudinal bore 343 (FIG. 8) coaxial to the axis of rotation 329a.

The housing longitudinal channel 354b terminates in the housing plane X—X (FIG. 10) of the housing cross channel 345, in a channel section 348a which is connected by way of a closure valve generally designated by reference numeral 350 and adapted to be valved in the opening direction by the operating pressure of the housing cross channel 345, with a further housing cross channel 348b which is in free connection at its ends with a respective housing connection $F_1$ and $F_2$ for the working spaces of the two hydropneumatic spring legs of a motor vehicle axle.

Figure 9:
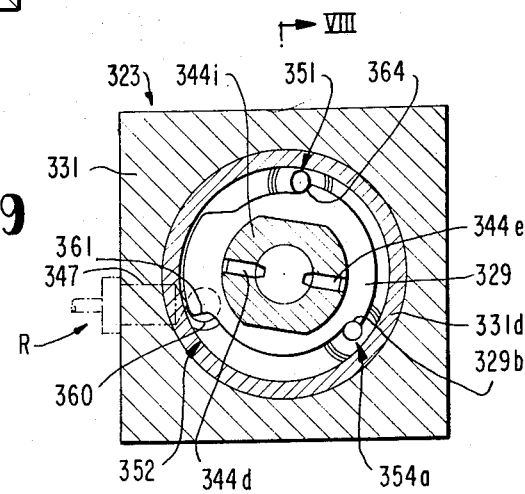
FIG. 9 is a cross-sectional view taken along line IX—IX of FIG. 8.
Figure 10:
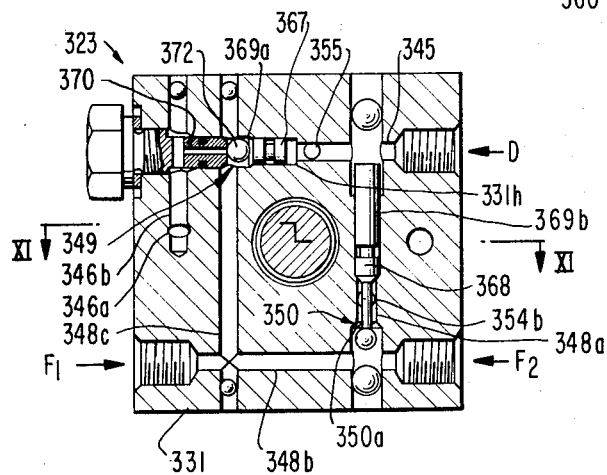
FIG. 10 is a cross-sectional view through the third embodiment of the control valve taken along line X—X of FIG. 8.

For the actuation of the three closure valves of the housing space 354, the rotary slide valve member 239 is provided with three control edges 364, 361 and 329b (FIG. 9). The two control edges 364 and 329b push open a ball opening into the associated housing longitudinal channel of the closure valve 351 and 354a constructed as check valves whereas the control edge 361 opens or closes the discharge orifice of the housing longitudinal channel 360. The arrangement is thereby made in such a manner that upon pushing open the closure valve 351, the closure valve 352 is positively or forcibly closed whereas the check valve 354a is opened by the pressure difference of the housing longitudinal channels 355 and 354b. Upon pushing open the check valve 354a, the longitudinal channel 360 is opened up whereas the closure valve 351 remains closed.

The rotary slide valve member 329 is rigidly connected with an adjusting sleeve 344i which is axially supported sliding between the two end walls 331a and 331e and is radially supported rotatable in the housing bore 343. A shaft section 344c of a valve-adjusting shaft 344 is radially supported and displaceably guided in the central aperture 344b (FIG. 8) of the adjusting sleeve 344i. The adjusting sleeve 344i is connected with the valve-adjusting shaft 344 for relative spiral or helical movement and, for that purpose, is provided with two fixed coupling pins 344d and 344e (FIG. 9) projecting radially inwardly into the aperture 344b; each coupling pin 344d and 344e engages in a longitudinal groove 344f (FIG. 8), extending at an inclination to the axis of rotation 329a, of the shaft section 344c non-rotatably in the circumferential direction and displaceably in the groove longitudinal direction. The valve-adjusting shaft 344 is subdivided by a collar 344g (FIG. 8) into a further shaft section 344h which is radially supported and displaceably mounted in the central bore 365a of a sleeve-shaped adjusting piston generally designated by reference numeral 365. The piston rod 365b of this adjusting piston 365 is guided in a pressure-tight and displaceable manner in a section 343a constricted in diameter of the housing bore 343 whereas the associated annular piston part 365c at the inner end of the piston rod 365b is guided in a pressure-tight and displaceable manner in the housing bore 343 itself. The annular piston part 365c abuts in one direction under the effect of a compression spring 394 (FIG. 8) supported under prestress between collar 344g and adjusting sleeve 344i, with its annular surface 365d (FIG. 11) adapted to be acted upon by the pressure medium at the housing shoulder 331f, into which terminates the bore 343a. The pressure medium for loading the annular surface 365d is supplied by way of a housing channel 346 which, at its one end, is in free communication with the housing connection N for the pressure medium auxiliary force and terminates at the other end in a section of the housing bore 343 indicated at 366 which is disposed between the housing shoulder 331f and the annular surface 365d.

An outer elastic abutment sleeve 388 is arranged concentrically to the adjusting piston 365 which, on the one hand, is supported at the valve housing 331 and, on the other, by way of an abutment disc 389 (FIG. 11) mounted over the piston rod 365b, at a retaining ring 391 inserted into an annular groove of the piston rod 365b.

A fixed outer end pin 344a (FIGS. 8 and 11) of the valve-adjusting shaft 344 is rigidly connected with an adjusting lever 329c which is supported as reaction member during the adjustment of the valve-adjusting shaft 344 at a rod-shaped housing abutment 331g (FIG. 11). The adjusting lever 329c forms an abutment, displaceable parallel to the axis of rotation 329a, for the control linkage indicated in dash and dot line at 328.

The housing cross channel 345 (FIG. 10) with a free communication to the housing connection D for the pressure medium working force is provided with a channel section 369a in which an adjusting piston 367 is guided in a pressure-tight and displaceable manner. The adjusting piston 367 acts in the closure direction on the valve ball of a closure valve generally designated by reference numeral 349 and constructed as check valve. The closure valve 349 closes a by-pass channel 370 which, on the one hand, can be brought into communication by this valve 349 with a further housing cross channel 348c and which, on the other, terminates by way of the connecting channels 346b and 346a in the housing channel 346, which is connected with the housing connection N for the pressure medium auxiliary force (FIG. 11). The housing channels 348b and 348c are freely connected with each other.

A further housing cross channel 348a, 369b terminates in the housing cross channel 345; the further housing cross channel 348a, 369b is subdivided by an adjusting piston 368 arranged therein in a pressure-tight and displaceable manner into the channel sections 348a and 369b. The adjusting piston 368 is provided with a plunger 350a which pushes open the closure ball of the closure valve 350 acting as check valve.

The closure ball 372 of the closure valve 349 also acts as check valve whereby the adjusting piston 367 is able to support itself as reaction member for the reaction effect at a fixed housing abutment edge 331h (FIG. 10) of its channel section 369a.

In this valve construction, also the reverse arrangement is possible in which the valve-adjusting shaft 344 is axially fixedly mounted and the adjusting sleeve 344i is axially adjustably supported.

OPERATION

The operation of the control valve 323 corresponds to that of the control valves 23, 123 and 223 and will be explained by reference to the four operating ranges produced by the shifting mechanism 42. The connections D, N, F and R of the control valve 323 are shifted corresponding to the arrangement of FIG. 1.

FIRST OPERATING RANGE

The two valve connections $D_{42}$ and $S_{42}$ and the two valve connections $N_{42}$ and $R_{42}$ are each connected with one another, respectively.

The by-pass channel 370 is closed off by the closure valve 349 whereas the channels 354b and 348b are connected with each other by the opened closure valve 350. The valve-adjusting shaft 344 is in the normal illustrated working position due to the effect of the compression spring 394 so that the valve-adjusting lever 329c is disposed in the normal center position with respect to the closure valves of the housing space 354 and the working pistons in operative connection with the housing connections $F_1$ and $F_2$ are adjusted to the normal intended or desired position.

SECOND OPERATING RANGE

Both valve connections $D_{42}$ and $N_{42}$ are in communication with the valve connection $S_{42}$.

The positions of the two closure valves 349 and 350 remain unchanged with respect to the first operating range. The adjusting piston 365 is displaced into an additional working position in the direction toward the adjusting sleeve 344i as a result of the pressure medium auxiliary force acting on the annular surface 365d, whereby the adjusting sleeve 344i and the rotary slide valve member 329 are rotated in the counter-clockwise direction and the check valve 351 is opened. The working pistons 25 spring-deflect out into a second desired or intended position. The lengthening or extension of the effective length of the control linkage (not shown) necessary for this spring deflection is achieved by the relative spiral rotation between adjusting sleeve 344i and valve-adjusting shaft 344. The check valve 351 is closed again when the rotary slide valve member 329 or the control edge 364 is brought back by the control linkage into the center position illustrated in FIG. 9, in which the position of the adjusting lever 329c is changed in the counter-clockwise direction through a rotary angle dependent on the pitch of the longitudinal groove 344f.

During the return movement of the valve-adjusting shaft 344 into the illustrated working position by the disengagement or disconnection of the pressure medium auxiliary force, the check valve 354a is temporarily opened in a corresponding manner until the parts 329 and 329c assume the illustrated angular position relative to each other and the working pistons are forcibly spring-deflected inwardly into the normal intended position.

The rotatable support of the valve-adjusting shaft 344 in the piston bore 365a provides the advantage that the high pressure seals 356 and 357 (FIG. 11) for the piston 365 do not partake in the rotary movements of the valve-adjusting shaft 344 so that the length of life of the seals is relatively high.

THIRD OPERATING RANGE

The two valve connections $N_{42}$ and $S_{42}$ as well as the valve connections $D_{42}$ and $R_{42}$ are connected with each other, respectively.

The by-pass channel 370 is in communication with the housing cross channel 348b by way of the opened closure valve 349 while the housing cross channel 348b, in its turn, is separated or closed off from the three closure valves of the housing space 354 by the closed closure valve 350. As a result thereof, the working pistons spring-deflect out into a constructively possible end position.

FOURTH OPERATING RANGE

The two valve connections $D_{42}$ and $N_{42}$ are in communication with the valve connection $R_{42}$.

The closure valve 350 remains closed. The adjusting piston 367 is brought into its abutment position at the housing edge 331h by the effect of the pressure in the working cylinders whereas the closure valve 372 under the same effect closes the by-pass channel 370. Consequently, the pressure medium filling in the working cylinders remains constant.

The valve control mechanism 42, which may be of any known construction, may, for example, be of the manually actuable type utilizing conventional control valves and therefore is not described in detail herein. However, the actuation thereof may also be indirect or in dependence on some other function, again utilizing conventional constructions.

While we have shown and described only several embodiments in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

We claim:

1. A control valve with a working pressure medium line for connection with at least one working-medium device having two parts to be adjusted relative to one another into an intended position and consisting of working cylinder and piston means, in which the working-pressure medium line is closed in a center position of a valve-adjusting means and in which, during a deflection of the valve-adjusting means in one direction, the working pressure medium line is brought into communication with a pressure source connection whereas during deflection of the valve-adjusting means in the opposite direction, the working pressure medium line is brought into communication with a pressure-relieved return line connection, first means forming in effect a first coupling system including valve housing means and a plurality of closure valve means, said closure valve means forming a first end member of the first coupling system, and said valve housing means serving as a functionally adjacent member for said first end member, second means forming in effect a second coupling system including said valve-adjusting means and control linkage means, said valve adjusting means forming a second end member of the second coupling system and said control linkage means serving as a functionally adjacent member for said second end member, and in which the first means is relatively fixedly arranged relative to one of said two parts while said second means is relatively fixedly arranged relative to the other of said two parts, characterized in that one of the first and second end members of said first and second means is adjustably connected with the functionally adjacent member of its coupling system and is adjustable by a pressure medium auxiliary motor means arranged on the inside of the valve housing means from a normal, first center position with respect to the other of said first and second end members into at least one additional center position so that upon displacement of said one end member from its pre-existing into its new center position, one of said closure valve means is initially opened whereby the coupling system having the other of said first and second end members is brought back into its relative center position with respect to the coupling system having said one end member as a result of the positional change of the working piston means occurring as a consequence of the opening of said one closure valve means, and therefore said one closure valve means is closed again, whereas at least another of said closure valve means is temporarily opened as a result of the return movement of the adjustable end member into the first center position, and a valve means being arranged in a line forming the working pressure medium connection for the control valve between a pressure source and an associated housing connection of the control valve, in a line forming the pressure-relieved return line connection for the control valve between a reservoir for the pressure source and an associated housing connection of the control valve, as well as in a line forming an auxiliary force pressure medium connection between the pressure source and an associated housing connection of the control valve, for the selective control of the pressure medium force in said working pressure medium connection line and said auxiliary force line in such a manner that either one or both lines are opened or closed for the pressure medium force, the lines in the closed condition being in communication with the pressure-relieved return line connection.

2. A control valve with a working pressure medium line for connection with at least one working-medium device having two parts to be adjusted relative to one another into an intended position and consisting of working cylinder and piston means, in which the working-pressure medium line is closed in a center position of a valve-adjusting means and in which, during a deflection of the valve-adjusting means in one direction, the working pressure medium line is brought into communication with a pressure source connection whereas during deflection of the valve-adjusting means in the opposite direction, the working pressure medium line is brought into communication with a pressure-relieved return line connection, first means forming in effect a first coupling system including valve housing means and closure valve means, said closure valve means forming an end member of the first coupling system, and said valve housing means serving as a functionally adjacent member for said end member, second means forming in effect a second coupling system including said valve-adjusting means and control linkage means, said valve adjusting means forming an end member of the second coupling system and said control linkage means serving as a functionally adjacent member for said end member, and in which the first means is relatively fixedly arranged relative to one of said two parts while said second means is relatively fixedly arranged relative to the other of said two parts, characterized in that one of the two end members of said first and second means is adjustably connected with the functionally adjacent member of its coupling system and is adjustable by a pressure medium auxiliary motor means arranged on the inside of the valve housing means from a normal, first center position with respect to the other end member into at least one additional center position so that upon displacement of said one end member from its pre-existing into its new center position, one of said closure valve means is initially opened and thereafter the coupling system having the other end member is brought back into its relative center position with respect to the coupling system having said one end member as a result of the positional change of the working piston means occurring as a consequence of such valve opening, and thereafter said one closure valve means is closed again, whereas the other closure valve means is temporarily opened as a result of the return movement of the adjustable end member into the first center position, said valve-housing means being provided with channel means including a by-pass channel means, by way of which a direct communication is established between a housing connection for the working pressure medium line and a housing connection for a pressure medium auxiliary line leading to said auxiliary motor means, and closure valve means arranged in the by-pass channel means which is controlled in the closing direction by the operating pressure present in the one of the housing channel means having a free communication with the housing connection for the pressure source.

3. A control valve according to claim 2, characterized in that a check valve means opening in the direction toward the working medium pressure line is arranged in the by-pass channel means.

4. A control valve according to claim 3, characterized in that a closure valve means adapted to be controlled in the opening direction is arranged in the housing channel means having a free communication with the housing connection for the working pressure medium line and is controllable by the operating pressure of the housing channel means having a free communication with the housing connection for the pressure source.

5. A control valve according to claim 4, characterized in that the closure valve means of the housing channel means having a free communication with the housing connection for the working pressure medium line is constructed as a check valve adapted to open in the direction toward the working pressure medium line.

6. A control valve according to claim 5, characterized by valve means arranged in a line forming a working pressure medium connection between said pressure source and an associated housing connection of the control valve as well as in a line forming an auxiliary force pressure medium connection between the pressure source and an associated housing connection of the control valve, for the selective control of the pressure medium force in said last-mentioned two lines in such a manner that either one or both lines are opened or closed for the pressure medium force.

7. A control valve according to claim 2, characterized in that a closure valve means adapted to be controlled in the opening direction is arranged in the housing channel means having a free communication with the housing connection for the working pressure medium line and is controllable by the operating pressure of the housing channel means having a free communication with the housing connection for the pressure source.

8. A control valve according to claim 7, characterized in that the closure valve means of the housing channel means having a free communication with the housing connection for the working pressure medium line is constructed as a check valve adapted to open in the direction toward the working pressure medium line.

9. A control valve according to claim 2, characterized by valve means arranged in a line forming a working pressure medium connection between said pressure source and an associated housing connection of the control valve as well as in a line forming an auxiliary force pressure medium connection between the pressure source and an associated housing connection of the control valve, for the selective control of the pressure medium force in said last-mentioned two lines in such a manner that either one or both lines are opened or closed for the pressure medium force.

10. A control valve according to claim 1, characterized in that an adjusting slide valve means arranged pressure-tight and displaceable in a housing bore of the valve housing means includes a pressure medium space as well as inlet and outlet channel means, and in that the pressure medium space is in continuous free communication with a first housing channel means that is adapted to be brought into communication with the housing connection for the working pressure medium line, and in that the pressure medium space is operatively connected by way of a respective one of said closure valve means adapted to be opened by the valve adjusting means with the inlet as well as with the outlet channel means, and in that both the inlet as well as the outlet channel means is in constant free communication with a respective one of two further housing channel means.

11. A control valve according to claim 10, characterized in that the adjusting slide valve means has a piston surface which is arranged in a section of the housing bore in which terminates a fourth housing channel means which is in free communication with the housing connection for the pressure medium auxiliary force.

12. A control valve according to claim 11, characterized in that the adjusting slide valve means is provided with a concentric axial bore which terminates at its ends in two sections of the housing bore separated from each other in a pressure-tight manner, and in that the axial bore is closed off by a check valve means opening into one of the sections and forming one of said closure valve means, said last-mentioned check valve means being pushed open by a valve-adjusting rod of said valve adjusting means extending through the other section of the housing bore and arranged coaxially in the axial bore.

13. A control valve according to claim 12, characterized in that a circumferential groove provided in the adjusting slide valve means is in free communication with a third section separated in a pressure-tight manner from the other two sections of the housing bore and is operatively connected by a check valve means forming another one of said closure valve means and adapted to be opened by the valve-adjusting rod, with the section of the housing bore through which extends the valve-adjusting rod, and in that the housing channel means terminates in the third section of said housing bore which is operatively connected with the housing connection for the return line.

14. A control valve according to claim 10, characterized in that the adjusting slide valve means is provided with a concentric axial bore which terminates at its ends in two sections of the housing bore separated from each other in a pressure-tight manner, and in that the axial bore is closed off by a check valve means opening into one of the sections and forming one of said closure valve means, said last-mentioned check valve means being pushed open by a valve-adjusting rod of said valve adjusting means extending through the other section of the housing bore and arranged coaxially in the axial bore.

15. A control valve according to claim 14, characterized in that a circumferential groove provided in the adjusting slide valve means is in free communication with a third section separated in a pressure-tight manner from the other two sections of the housing bore and is operatively connected by a check valve means forming another one of said closure valve means and adapted to be opened by the valve-adjusting rod, with the section of the housing bore through which extends the valve-adjusting rod, and in that the housing channel means terminates in the third section of said housing bore which is operatively connected with the housing connection for the return line.

16. A control valve according to claim 13, characterized in that said valve-housing means is provided with channel means including a by-pass channel means, by way of which a direct communication is established between the housing connection for the working pressure medium line and the housing connection for a pressure medium auxiliary line leading to said auxiliary motor means, and closure valve means arranged in the by-pass channel means which is controlled in the closing direction by the operating pressure present in the one of the housing channel means having a free communication with the housing connection for the pressure source.

17. A control valve according to claim 16, characterized in that a check valve means opening in the direction toward the working medium pressure line is arranged in the by-pass channel means.

18. A control valve according to claim 17, characterized in that a closure valve means adapted to be controlled in the opening direction is arranged in the housing channel means having a free communication with the housing connection for the working pressure medium line and is controllable by the operating pressure of the housing channel means having a free communication with the housing connection for the pressure source.

19. A control valve according to claim 18, characterized in that the closure valve means of the housing channel means having a free communication with the housing connection for the working pressure medium line is constructed as a check valve adapted to open in the direction toward the working pressure medium line.

20. A control valve according to claim 1, characterized in that a valve-adjusting shaft means supported axially adjustable with respect to the closure valve means arranged in the valve housing means is non-rotatably connected with the control linkage means in relation to its shaft axis and longitudinally displaceable along said axis, and in that the valve-adjusting shaft means is provided for each of its center positions disposed one behind the other in the circumferential direction with a separate axially extending control edge pair for the adjustment of the working piston means into the desired position thereof as also with two control edges extending in the circumferential direction for the adjustment of the working piston means between two desired positions, and in that the valve-adjusting shaft means is rotatably and axially displaceably connected with a coaxial auxiliary adjusting piston means guided in a pressure-tight and displaceable manner in the valve housing means.

21. A control valve according to claim 20, characterized in that two trough-shaped recesses disposed mutually axially offset and mutually offset in the circumferential direction are provided at the circumference of the valve-adjusting shaft means, the lateral edges of said recesses mutually facing in the circumferential direction being constructed step-shaped in such a manner that the axial control edge for one center position is connected by a control edge extending in the circumferential direction with the axial control edge for the adjacent center position.

22. A control valve according to claim 20, characterized in that five substantially H-shaped housing channel means are arranged in a first housing plane containing the axis of the valve-adjusting shaft means, the web channel means disposed parallel to the valve-adjusting shaft means being operatively connected by a respective closure check valve forming one of said closure valve means and adapted to be opened by the valve-adjusting shaft means, with two parallel leg channel means disposed on different sides of the web channel means and perpendicular to the valve-adjusting shaft means, and in that each of said leg channel means is in free communication with a respective housing cross channel means substantially perpendicular to the first housing plane, said last-mentioned housing cross channel means terminating, in turn, in a housing connection for the pressure source and the return line, respectively.

23. A control valve according to claim 22, characterized in that the leg channel means disposed together with the valve shaft means on the same side of the web channel means, terminate in the housing bore of the valve shaft means, and in that the closure check valve means of one of said leg channel means opens into the web channel means and is pushed open by a ball cooperating with the associated recess of the valve-adjusting shaft means, said ball being form-lockingly and displaceably guided in the end section on the side of the shaft of said one leg channel means, and in that an adjusting piston means is guided in a pressure-tight and displaceable manner in the other leg channel means terminating in the housing bore of the valve adjusting shaft means, the adjusting piston means abutting at its shaft side end at a further ball form-lockingly and displaceably guided in the other leg channel means, said further ball cooperating with the other recess of the valve-adjusting shaft means, and in that the adjusting piston means controls with its other end the other closure check valve means opening in the direction of the opposite coaxial leg channel means.

24. A control valve according to claim 23, characterized in that the free fourth leg channel means is in free communication both with the web channel means as also with a third housing cross channel means disposed substantially perpendicularly to the housing plane, and in that the third housing cross channel means terminates in a housing channel means which is arranged in a second housing plane parallel to the first housing plane, and in that the last-mentioned housing channel means is adapted to be brought into communication by a closure check valve means adapted to be opened with at least one further housing channel means of the second housing plane which in its turn is in free communication by way of an additional housing cross channel means substantially perpendicular to the second housing plane with a housing connection for the working pressure medium line.

25. A control valve according to claim 24, characterized in that four housing channel means arranged in substantially rectangular shape are provided in the second housing plane extending through the working space of the auxiliary adjusting piston means, said last-mentioned four housing channel means including two longitudinal channel means extending substantially parallelly to the valve-adjusting shaft means and two lateral channel means extending substantially perpendicularly thereto, one of said lateral channel means having a channel section subdivided by a closure valve means adapted to be opened, said channel section being in free communication both with said working space of the auxiliary adjusting piston means as also with a further housing cross channel means substantially perpendicular to said second housing plane, said further housing cross channel means terminating in the housing connection for the pressure medium auxiliary force.

26. A control valve according to claim 25, characterized in that an adjusting piston means cooperating with the last-mentioned closure valve means is guided in a pressure-tight and displaceable manner in the section of the lateral channel means adapted to be closed with respect to the working space by the auxiliary adjusting piston means, and in that said last-mentioned channel section is in free communication at its ends with the two longitudinal channel means.

27. A control valve according to claim 26, characterized in that the housing cross channel means in free communication with the web channel means of the first housing plane terminates in one longitudinal channel means of the second housing plane between the closure valve means adapted to be opened and an associated adjusting piston means guided in said longitudinal channel means in a pressure-tight and displaceable manner, and in that the end of said last-mentioned longitudinal channel means opposite said last-mentioned closure valve means is in free communication with the housing cross channel means terminating in the housing connection for the pressure source as also with the adjoining section of the one of said lateral channel means adapted to be closed off with respect to the working space by said auxiliary piston means.

28. A control valve according to claim 27, characterized in that the other longitudinal channel means of said second housing plane is subdivided by a check valve means into a by-pass channel section and a further channel section, and in that the by-pass channel section terminates in the section of said one lateral channel means adapted to be closed with respect to the working space by said auxiliary adjusting piston means, and in that the other channel section of the other longitudinal channel means is in free communication with a housing cross channel means terminating in the housing connection for one working pressure medium line as also with the other lateral channel means, and that said other lateral channel means is operatively connected with the first longitudinal channel means by way of one of said check-valve means and is in free communication with a further housing cross channel terminating in a second housing connection for another working pressure medium line.

29. A control valve according to claim 28, characterized in that two trough-shaped recesses disposed mutually axially offset and mutually offset in the circumferential direction are provided at the circumference of the valve-adjusting shaft means, the lateral edges of said recesses mutually facing in the circumferential direction being constructed step-shaped in such a manner that the axial control edge for one center position is connected by a control edge extending in the circumferential direction with the axial control edge for the adjacent center position.

30. A control valve according to claim 1, characterized in that the valve-adjusting means is constructed as multi-partite adjusting unit, having an input member operatively connected with the control linkage means and adapted to be adjusted into several operating positions by the pressure medium auxiliary force with respect to an output member equipped with means for the actuation of said closure valve means arranged in the valve housing means so that the input member assumes for each intended position of the working piston means a different center position with respect to the closure valve means whereas the output member has in all intended positions of the working piston means the same center position with respect to the closure valve means.

31. A control valve according to claim 30, characterized in that a rotary slide valve means rotatably and axially non-displaceably supported in the valve housing means is non-rotatably connected with an adjusting sleeve means which is operatively connected for relative spiral movement by way of inclined surface means with a valve-adjusting shaft means operatively connected with the control linkage means, and in that the helically adjustable member of the valve adjusting shaft means which is adjustable by the pressure medium auxiliary force, is supported axially adjustable in the valve housing means whereas the other helically movable adjusting member thereof is non-adjustably mounted in the valve-housing means.

32. A control valve according to claim 31, characterized in that the axially adjustable valve-adjusting shaft means is operatively connected with the control linkage means non-rotatably in relation to its axis and displaceably along said axis and is non-displaceably supported at least in one direction in a sleeve-shaped auxiliary adjusting piston means which, in its turn, is guided in a pressure-tight and displaceable manner in a housing bore.

33. A control valve according to claim 31, characterized in that the valve-adjusting shaft means is supported at one end by the auxiliary adjusting piston means in the manner of a bearer on two supports and at the other end radially in the valve housing means by the adjusting sleeve means.

34. A control valve according to claim 32, characterized in that the auxiliary adjusting piston means engages at one end at a collar of the valve-adjusting shaft means and is provided at the other end with an external abutment ring, and in that a sleeve of elastic material and concentric to the auxiliary adjusting piston means is arranged between the abutment ring and the valve housing means.

35. A control valve according to claim 34, characterized in that the section of the valve-adjusting shaft means engaging in the adjusting sleeve means is provided with at least one longitudinal groove inclined to the axis of rotation, in which a fixed coupling pin of the adjusting sleeve means is guided non-rotatably and longitudinally displaceably.

36. A control valve according to claim 35, characterized in that four housing channel means arranged in a substantially rectangular shape and mutually connected at the corners thereof are provided in a housing plane parallel to the plane of rotation of the rotary slide valve means, two of said housing channel means being adapted to be closed off at the free ends thereof by a respective closure valve means with respect to another housing channel means, in that the mutually connected channel sections of said two last-mentioned housing channel means are in free communication with a housing connection for the pressure source as well as with a housing longitudinal channel means substantially parallel to the axis of the valve-adjusting shaft means, said last-mentioned longitudinal channel means being operatively connected with the housing space of the rotary slide valve means by way of a check valve means adapted to be opened by the rotary slide valve means.

37. A control valve according to claim 36, characterized in that the housing channel means provided with the closure valve means adapted to be opened is subdivided into a second channel section by an adjusting piston means guided in a pressure-tight and displaceable manner in said channel section and having a free communication with the housing connection for the pressure source, said second channel section being in free communication with a further housing longitudinal channel means and being operatively connected with the third housing channel means of said housing plane by way of said last-mentioned closure valve means, and in that the third housing channel means terminates in at least one housing connection for a working pressure medium line.

38. A control valve according to claim 37, characterized in that the housing channel means provided with the closure valve means adapted to be closed includes a second channel section which is subdivided with respect to the channel section having the free communication to the housing connection for the pressure source by an adjusting piston means guided in the housing channel in a pressure-tight and displaceable manner, and in that the second channel section is in free communication with the fourth housing channel means and in that the fourth housing channel means terminates in the housing channel means with the free communication with a housing connection for a working pressure medium line.

39. A control valve according to claim 38, characterized in that a by-pass channel means arranged in said housing plane is operatively connected at one of its ends by said closure valve means adapted to be closed with the fourth housing channel means having a free communication with the housing connections for a pressure medium line each and is in free communication by way of a further housing channel means with the housing connection for the pressure medium auxiliary force.

40. A control valve according to claim 39, characterized in that the closure valve means adapted to be closed has a closure cone portion acting as check valve which, in its turn, is adapted to be brought into abutment against the orifice of the by-pass channel means and, on the other, at the adjusting piston means of the closure valve means, and in that said adjusting piston means is adapted to be supported in the opening direction of a closure ball at a housing edge of its channel section.

41. A control valve according to claim 40, characterized in that the axially adjustable valve-adjusting shaft means is operatively connected with the control linkage means non-rotatably in relation to its axis and displaceably along said axis and is non-displaceably supported at least in one direction in a sleeve-shaped auxiliary adjusting piston means which, in its turn, is guided in a pressure-tight and displaceable manner in a housing bore.

42. A control valve according to claim 31, characterized in that four housing channel means arranged in a substantially rectangular shape and mutually connected at the corners thereof are provided in a housing plane parallel to the plane of rotation of the rotary slide valve means, two of said housing channel means being adapted to be closed off at the free ends thereof by a respective closure valve means with respect to another housing channel means, in that the mutually connected channel sections of said two last-mentioned housing channel means are in free communication with a housing connection for the pressure source as well as with a housing longitudinal channel means substantially parallel to the axis of the valve-adjusting shaft means, said last-mentioned longitudinal channel means being operatively connected with the housing space of the rotary slide valve means by way of a check valve means adapted to be opened by the rotary slide valve means.

43. A control valve according to claim 42, characterized in that the housing channel means provided with the closure valve means adapted to be opened is subdivided into a second channel section by an adjusting piston means guided in a pressure-tight and displaceable manner in said channel section and having a free communication with the housing connection for the pressure source, said second channel section being in free communication with a further housing longitudinal channel means and being operatively connected with the third housing channel means of said housing plane by way of said last-mentioned closure valve means, and in that the third housing channel means terminates in at least one housing connection for a working pressure medium line.

44. A control valve according to claim 43, characterized in that the housing channel means provided with the closure valve means adapted to be closed includes a second channel section which is subdivided with respect to the channel section having the free communication to the housing connection for the pressure source by an adjusting piston means guided in the housing channel in a pressure-tight and displaceable manner, and in that the second channel section is in free communication with the fourth housing channel means and in that the fourth housing channel means terminates in the housing channel means with the free communication with a housing connection for a working pressure medium line.

45. A control valve according to claim 44, characterized in that a by-pass channel means arranged in said housing plane is operatively connected at one of its ends by said closure valve means adapted to be closed with the fourth housing channel means having a free communication with the housing connections for a pressure medium line each and is in free communication by way of a further housing channel means with the housing connection for the pressure medium auxiliary force.

46. A control valve according to claim 45, characterized in that the closure valve means adapted to be closed has a closure cone portion acting as check valve which, in its turn, is adapted to be brought into abutment against the orifice of the by-pass channel means and, on the other, at the adjusting piston means of the closure valve means, and in that said adjusting piston means is adapted to be supported in the opening direction of a closure ball at a housing edge of its channel section.

* * * * *